(12) United States Patent
Oesterle et al.

(10) Patent No.: US 9,145,802 B2
(45) Date of Patent: Sep. 29, 2015

(54) HEAT EXCHANGER

(71) Applicant: Eberspächer Exhaust Technology GmbH & Co. KG, Neunkirchen (DE)

(72) Inventors: Jörg Oesterle, Laichingen (DE); Angela Hettel, Leinfelden-Echterdingen (DE); Ming Dong, Stuttgart (DE); Enver Kurpejovic, Lenningen (DE); Anika Bürkle, Stuttgart (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 176 days.

(21) Appl. No.: 13/969,906

(22) Filed: Aug. 19, 2013

(65) Prior Publication Data

US 2014/0047822 A1 Feb. 20, 2014

(30) Foreign Application Priority Data

Aug. 20, 2012 (DE) .......................... 10 2012 214 759

(51) Int. Cl.

| | |
|---|---|
| *F01N 3/02* | (2006.01) |
| *F01N 3/00* | (2006.01) |
| *F01N 3/04* | (2006.01) |
| *F01N 5/02* | (2006.01) |
| *F28D 21/00* | (2006.01) |

(52) U.S. Cl.
CPC .................. *F01N 3/00* (2013.01); *F01N 3/043* (2013.01); *F01N 5/025* (2013.01); *F28D 21/0003* (2013.01); *Y02T 10/16* (2013.01); *Y02T 10/20* (2013.01)

(58) Field of Classification Search
CPC ........... F01N 3/043; F01N 5/025; F01N 3/00; F28D 21/0003
USPC ..................................... 60/275, 320
See application file for complete search history.

(56) References Cited

U.S. PATENT DOCUMENTS

| | | | | |
|---|---|---|---|---|
| 4,730,459 | A | * | 3/1988 | Schlicklin et al. ............... 62/3.7 |
| 5,511,613 | A | | 4/1996 | Mohn et al. |
| 6,119,457 | A | * | 9/2000 | Kawamura ...................... 60/618 |
| 2004/0177623 | A1 | * | 9/2004 | Zelissen et al. .................. 62/3.7 |
| 2011/0252774 | A1 | * | 10/2011 | Spieth et al. ..................... 60/320 |
| 2012/0012146 | A1 | * | 1/2012 | Salzgeber ..................... 136/205 |

FOREIGN PATENT DOCUMENTS

| | | |
|---|---|---|
| DE | 10 2010 022 225 A1 | 12/2011 |
| EP | 0 717 251 A2 | 6/1996 |
| WO | WO 2007026432 A1 * | 3/2007 |

* cited by examiner

*Primary Examiner* — Jason Shanske

(74) *Attorney, Agent, or Firm* — McGlew and Tuttle, P.C.

(57) ABSTRACT

A heat exchanger (7) for an exhaust system (5) of an internal combustion engine (1), includes a heating tube (16) for carrying hot exhaust gas and a cooling tube (17) for carrying a liquid cooling agent. A thermoelectric generator (13) generates an electric voltage from a temperature difference and is arranged with the adjacent tubes in a stacking direction (18) to form a stack (21). A support tube (28) is supported in the stacking direction on wall sections (29) of the respective tube (16, 17), which wall sections mutually face each other, and is arranged in the respective heating tube (16) and/or cooling tube (17). Increased energy efficiency is achieved if at least two support tubes (28), which differ from one another by tube length and/or tube end (30) and/or by tube cross sections, are arranged in the respective tube (16, 17) at right angles to a longitudinal direction (31).

20 Claims, 8 Drawing Sheets

HEAT EXCHANGER

CROSS REFERENCE TO RELATED APPLICATIONS

This application claims the benefit of priority under 35 U.S.C. §119 of German Patent Application DE 10 2012 214 759.4 filed Aug. 20, 2012, the entire contents of which are incorporated herein by reference.

FIELD OF THE INVENTION

The present invention pertains to a heat exchanger for an exhaust system of an internal combustion engine, especially of a motor vehicle, with at least one heating tube for carrying hot exhaust gas of the internal combustion engine and with at least one cooling tube for carrying a liquid cooling agent and with at least one thermoelectric generator for generating an electrical voltage from a temperature difference. The thermoelectric generator is arranged between the heating tube and the cooling tube and the heating tube, the thermoelectric generator and the cooling tube are adjacent to one another and form a stack. A support tube is arranged in the heating tube and/or in the cooling tube.

BACKGROUND OF THE INVENTION

A heat exchanger, which comprises a plurality of heating tubes for carrying hot exhaust gas of the internal combustion engine, a plurality of cooling tubes for carrying a liquid cooling agent and a plurality of thermoelectric generators for generating an electric voltage from a temperature difference, wherein the thermoelectric generators are arranged each between such a heating tube and such a cooling tube, is known from DE 10 2010 022 225 A1. Furthermore, the heating tubes, thermoelectric generators and cooling tubes are arranged adjacent to each other in a stacking direction and form a stack.

A thermoelectric generator can convert a heat flux into an electric current or a temperature difference into an electric voltage by utilizing the so-called Seebeck effect. The Seebeck effect is based on an inversion of the Peltier effect. Such thermoelectric generators can therefore be used to recover heat or to generate electrical energy from heat and can be correspondingly used, e.g., in exhaust systems of internal combustion engines, preferably in motor vehicles, to improve the energy efficiency of the internal combustion engine or of the vehicle.

To improve the heat transfer between the thermoelectric generators and the heating and cooling tubes, it is, moreover, common practice to load the stack in the stacking direction with a force of pressure. To prevent the heating and cooling tubes from becoming indented in their cross sections in the process, a support structure, which braces the respective tube from the inside, is arranged in the heating and cooling tubes in the prior-art heat exchanger. Such a support structure may also be designed as a tube, i.e., as a support tube.

SUMMARY OF THE INVENTION

An object of the present invention is to provide an improved embodiment for a heat exchanger of the type mentioned in the introduction, which is characterized especially by improved energy efficiency.

The present invention is based on the general idea of arranging a plurality of such support tubes in the respective heating or cooling tube, and at least two such support tubes are geometrically different. It was found that specific flow routing or flow guiding can be achieved for the exhaust gas in the respective heating tube or for the cooling agent in the respective cooling tube by means of different geometries, especially different tube lengths and/or different tube ends and/or different tube cross sections, in conjunction with different positions within the respective heating or cooling tube. It will then be possible due to a specific flow routing within the cooling tubes and within the heating tubes especially to homogenize the temperature distribution within the respective tube at right angles to the direction of flow. A homogeneous temperature distribution within the cooling and heating tubes also leads to a homogeneous thermal load on the thermoelectric generators, as a result of which the efficiency of the thermoelectric conversion within the respective thermoelectric generator can be improved.

Since the cooling and heating tubes within such a heat exchanger equipped with thermoelectric generators usually have comparatively flat cross sections, a temperature gradient can become established within the respective tube at right angles to the direction of flow, especially when an inlet cross section and/or an outlet cross section of the respective tube is significantly smaller than the respective tube cross section in the area of the thermoelectric generators. This temperature gradient can be reduced by means of the support tubes arranged and designed for flow routing or flow conduction, as a result of which homogenization of the temperature within the respective tube at right angles to the direction of flow of the respective medium can be achieved.

Corresponding to an advantageous embodiment, the stack may be loaded in the stacking direction with a force of pressure, which braces the respective heating tube, the respective thermoelectric generator and the respective cooling tube with one another. Furthermore, provisions may be made in such an embodiment with a stack subjected to pressure load for the respective support tube to have a round tube cross section and be elastically deformed by the force of pressure. In other words, the support tubes used in this embodiment act as springs in order to push the wall sections located opposite each other in the stacking direction within the respective cooling or heating tube towards the outside in order to generate an opposing force to the force of pressure acting on the stack hereby. In particular, the support tubes thus have, in a relaxed state of the stack, in which the force of pressure is absent, a cross section that is different from the cross section they have in a braced state, in which the force of pressure acts on the stack. As a result, the support tubes have no rigid support structures, but elastic springs in order to absorb the force of pressure within the stack. In particular, changes in stress caused by thermal effects can be compensated hereby.

In another advantageous embodiment, the support tubes are located at spaced locations from one another at right angles to their longitudinal direction within the respective cooling or heating tube. As a result, the individual support tubes are not in contact with one another. Furthermore, the support tubes touch the respective heating or cooling tube exclusively radially in relation to their longitudinal direction according to an advantageous embodiment.

Corresponding to another, especially advantageous embodiment, the support tubes are open on the end side and are arranged in the respective heating or cooling tube such that the exhaust gas or the cooling agent can flow past and through them. The support tubes thus have within the respective cooling or heating tube a routing or guiding function for the exhaust gas and for the cooling agent not only due to their outer contour, but also due to their inner contour, because the exhaust gas or the cooling agent can flow through them.

The support tubes advantageously have a cross section closed in the circumferential direction, as a result of which especially strong forces of pressure can be supported. However, it is possible, in principle, to provide at least one of the support tubes with an open cross section, which may be, for example, C-shaped. The respective support tube now has a slot, which extends continuously along the entire length of the tube.

Furthermore, the support tubes preferably have a radially closed tube wall. However, an embodiment in which at least one support tube has at least one radial opening, which passes through the tube wall, so that a tube interior space is fluidically connected with the interior of the respective heating or cooling tubes, is also possible, in principle. The spring action of the support tube and the flow routing action thereof can be set by means of these radial openings, which may be embodied, e.g., as round or slot-like openings or as a perforation.

According to another advantageous embodiment, at least one such support tube may have on its outer side at least one flattened circumferential area, which is flatly supported on the respective wall section of the respective cooling or heating tube. Preferred here is a variant in which the respective support tube has two diametrically opposite, flattened circumferential areas, which are flatly supported on the wall sections of the respective cooling or heating tube. The respective circumferential area may be especially planar. This is the case especially in support tubes that have a round cross section. Round cross sections are, for example, round or elliptical or oval cross sections. Flat contacting between the support tubes and the respective heating or cooling tube is possible due to such flattened areas, as a result of which the surface pressure in the wall of the respective tube can be reduced. Furthermore, such a flat contacting makes possible an improved heat transfer between the support tubes and the respective heating or cooling tube. This is especially advantageous if the exhaust gas or cooling agent also flows through the support tubes.

According to another advantageous embodiment, the respective cooling or heating tube may have at its longitudinal ends an inlet area and an outlet area, which extend in the transverse direction of the tube, which extends at right angles to the longitudinal direction of the tube and at right angles to the stacking direction. An inlet pipe connection can then be connected to this inlet area. An outlet pipe connection may be connected to this outlet area in the transverse direction of the tube in the opposite direction from or in the same direction as the inlet pipe connection. The exhaust gas or cooling agent is fed and removed due to this mode of construction at right angles to the longitudinal direction of the respective tube and hence at right angles to the principal direction of flow within the respective tube. As a result, the respective stack has a comparatively compact design in the longitudinal direction. At the same time, the arrangement and geometry of the support tubes can be used in such a mode of construction to deflect the incoming flow as well as the outgoing flow specifically such that the desired, most homogeneous temperature distribution possible can become established within the respective tube.

Corresponding to an advantageous variant, the support tubes may dip to different depths in their longitudinal direction into the inlet area and into the outlet area. The desired deflection can be achieved due to this measure at the inlet area and at the outlet area in an especially simple manner.

At least one support tube may have at least one beveled tube end in another advantageous variant, wherein the respective tube end is beveled such that a tube opening, which is located at the respective tube end, faces the inlet pipe connection or the outlet pipe connection. For example, a tube opening facing the inlet pipe connection at the inlet-side tube end can support a flow deflection from the inlet area into the respective support tube. Analogously hereto, a tube opening facing the outlet pipe connection at the outlet-side tube end can support a deflection of the flow leaving the respective support tube in the outlet area.

In another advantageous embodiment, the respective heating or cooling tube may be manufactured according to the semimonocoque construction, so that it has two half shells, for example, an upper shell and a lower shell. The support tubes are advantageously fastened to one of the two half shells only. This leads to an especially simple manufacturing process for the heat exchanger.

The semimonocoque construction may, in particular, also be designed such that each half shell comprises half of an inlet pipe connection and half of an outlet pipe connection, so that the pipe connections are completed at the time of assembly of the half shells only.

In an alternative embodiment, the respective heating or cooling tube may be embodied as a segmented construction, in which an end piece comprising the inlet pipe connection and an end piece comprising the outlet pipe connection are attached on the front side to a tubular or jacket-shaped middle piece containing the support tubes.

Provisions may be made according to another advantageous embodiment for the support tubes to extend within the respective cooling or heating tube in a straight line and in parallel to a longitudinal direction of the respective cooling or heating tube. This leads to an embodiment that can be manufactured in an especially simple manner. As an alternative, an embodiment is also conceivable in which at least one of the support tubes does not extend in a straight line and/or does not extend in parallel to the longitudinal direction of the cooling or heating tube. For example, such a support tube may extend in a serpentine or zigzag pattern.

The support tubes advantageously have, each in itself, a cross section that is constant in the longitudinal direction of the respective tube. However, an embodiment in which at least one support tube has a tube cross section varying in the longitudinal direction of the tube is also conceivable, in principle. Such a support tube may have, for example, round end cross sections, which pass continuously over into an elliptical or oval middle cross section. In particular, the supporting forces, preferably the spring forces, can be varied in the longitudinal direction of the respective heating or cooling tube by means of support tubes, whose cross-sectional geometry varies in the longitudinal direction of the tube, for example, in order to adapt these to the respective deformation characteristics of the respective tube.

It is apparent that the above-mentioned features, which will also be explained below, can be used not only in the particular combination indicated, but also in other combinations or alone without going beyond the scope of the present invention.

Preferred embodiments of the present invention are shown in the drawings and will be explained in more detail in the following description, in which identical reference numbers designate identical or similar or functionally identical components. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
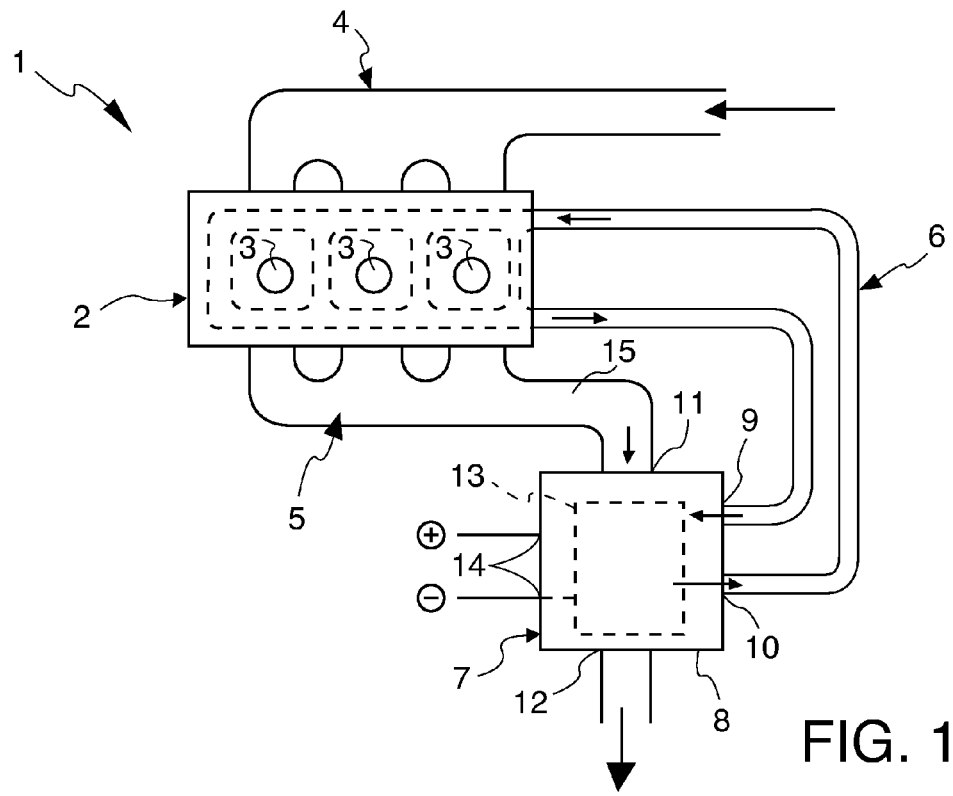
FIG. 1 is a highly simplified, diagram-like schematic view of an internal combustion engine, whose exhaust system contains a heat exchanger.

Referring to the drawings in particular, corresponding to FIG. 1, an internal combustion engine 1, which may preferably be used in a motor vehicle, comprises an engine block 2, which contains a plurality of combustion chambers 3, a fresh air feed means 4 for supplying the combustion chambers 3 with fresh air and an exhaust system 5 for removing exhaust gas from the combustion chambers 3. Furthermore, the internal combustion engine 1 is equipped with a cooling circuit 6, by means of which the engine block 2 can be cooled. It is clear that a cooler, not shown here, may be additionally provided in the cooling circuit 6, possibly in conjunction with a blower, in order to make it possible to correspondingly cool the cooling agent being carried in the cooling circuit 6. The cooling circuit 6 used to cool the engine block 2 may also be called engine cooling circuit or primary cooling circuit. In addition to this primary cooling circuit 6, it is optionally possible to provide a separate cooling circuit, not shown here, which may also be called secondary cooling circuit and which may have especially a cooler of its own, optionally a blower of its own, and a separate cooling agent. The secondary cooling circuit may be operated especially at a temperature level different from that of the primary cooling circuit 6.

The internal combustion engine 1 is equipped, besides, with a heat exchanger 7, whose housing 8 has a cooling agent inlet 9, a cooling agent outlet 10, a heating medium inlet 11 and a heating medium outlet 12. Heat exchanger 7 is fluidically integrated into the exhaust system 5 or into an exhaust gas line 15 of the exhaust system 5 via its heating medium inlet 11 and its heating medium outlet 12, with the exhaust gas acting in the heat exchanger 7 as a heating medium or heating fluid. Furthermore, the heat exchanger 7 is integrated via its cooling agent inlet 9 and its cooling agent outlet 10 into the cooling circuit 6, whose cooling agent is also used as cooling agent or cooling fluid in the heat exchanger 7. The heat exchanger 7 is thus integrated into the primary cooling circuit 6 in the example being shown. The heat exchanger 7 may also be integrated into the above-mentioned secondary cooling circuit in an alternative embodiment.

Heat exchanger 7 contains, besides, at least one thermoelectric generator 13, which is coupled in the interior of the heat exchanger 7 with the heating fluid and with the cooling fluid in a heat-transferring manner. In addition, electrical terminals 14, which are correspondingly connected electrically to the respective thermoelectric generator 13, are formed on housing 8.

Figure 2:
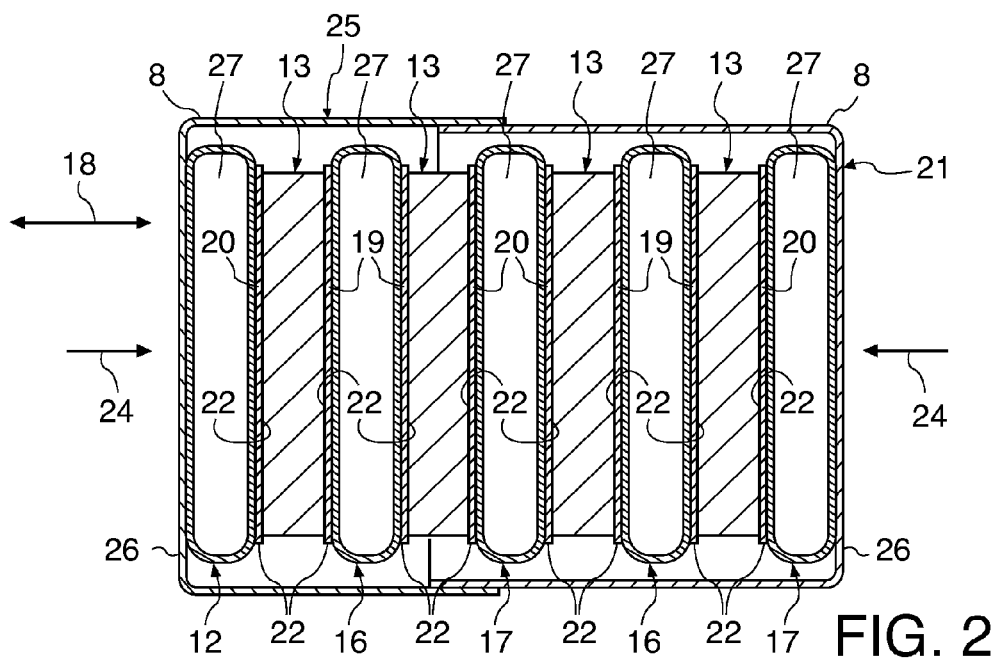
FIG. 2 is a highly simplified longitudinal section of the heat exchanger with heating and cooling tubes shown in a simplified form.

Corresponding to FIG. 2, heat exchanger 7 comprises a plurality of heating tubes 16 for carrying the heating fluid, i.e., the exhaust gas; a plurality of cooling tubes 17 for carrying the cooling fluid, i.e., the cooling agent; and a plurality of thermoelectric generators 13, which are arranged each between a heating tube 16 and a cooling tube 17 in a stacking direction 18. The respective thermoelectric generator 13 has a hot side 19 and a cold side 20, which face away from each other in the stacking direction 18. The arrangement of the thermoelectric generators 13 and of the heating tubes 16 as well as of the cooling tubes 17 forms a stack 21, in which the respective hot side 19 faces a heating tube 16 and in which the respective cold side 20 faces a cooling tube 17. In addition, a heat conduction layer 22 each, which is preferably a graphite film, which may hereinafter likewise be designated by 22, is arranged in the stacking direction 18 between the respective thermoelectric generator 13 and the respective tube 16, 17, in the example shown in FIG. 2.

Figure 3:
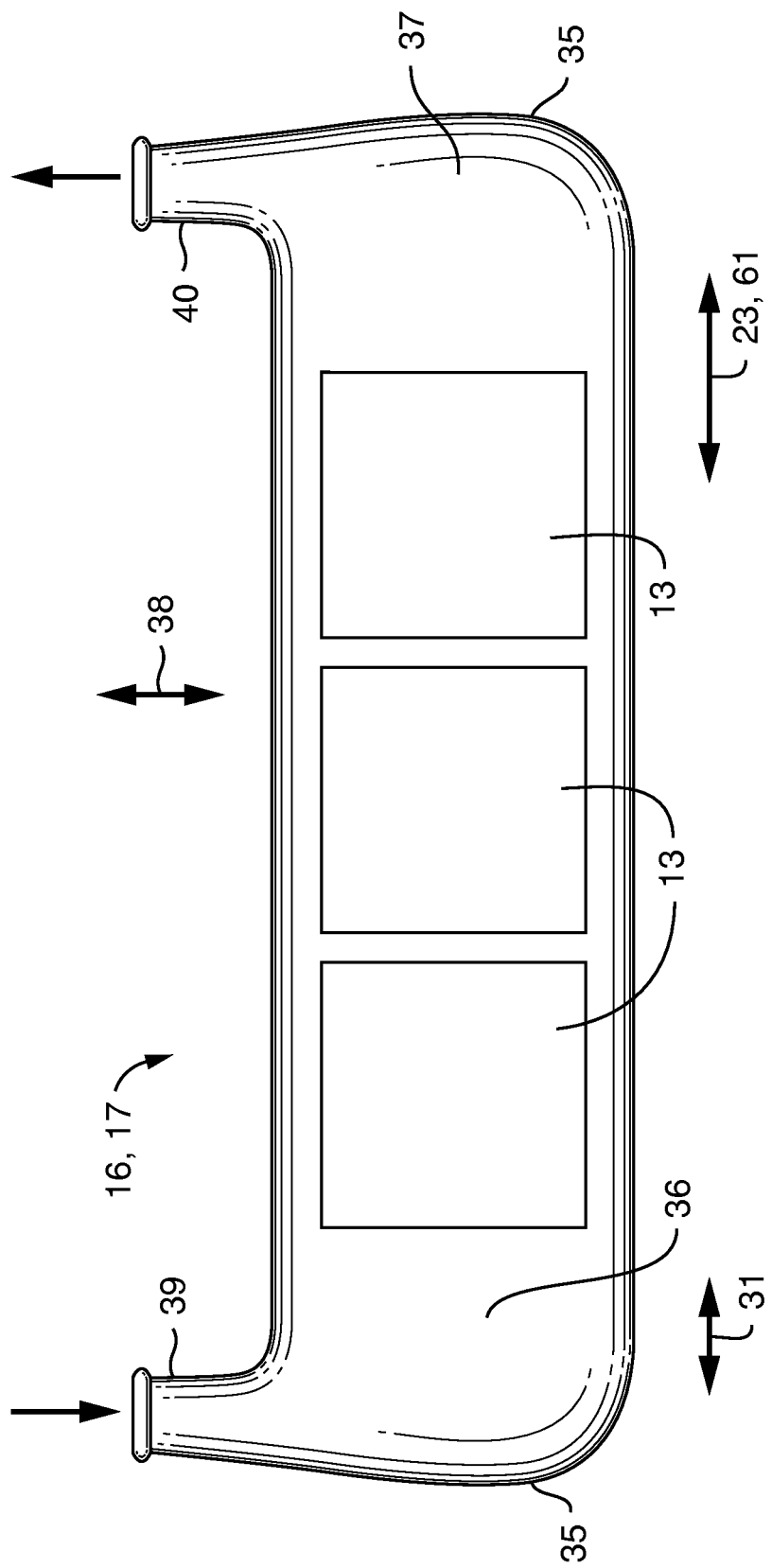
FIG. 3 is a side view of such a heating or cooling tube with thermoelectric generators arranged thereon.
Figure 4:
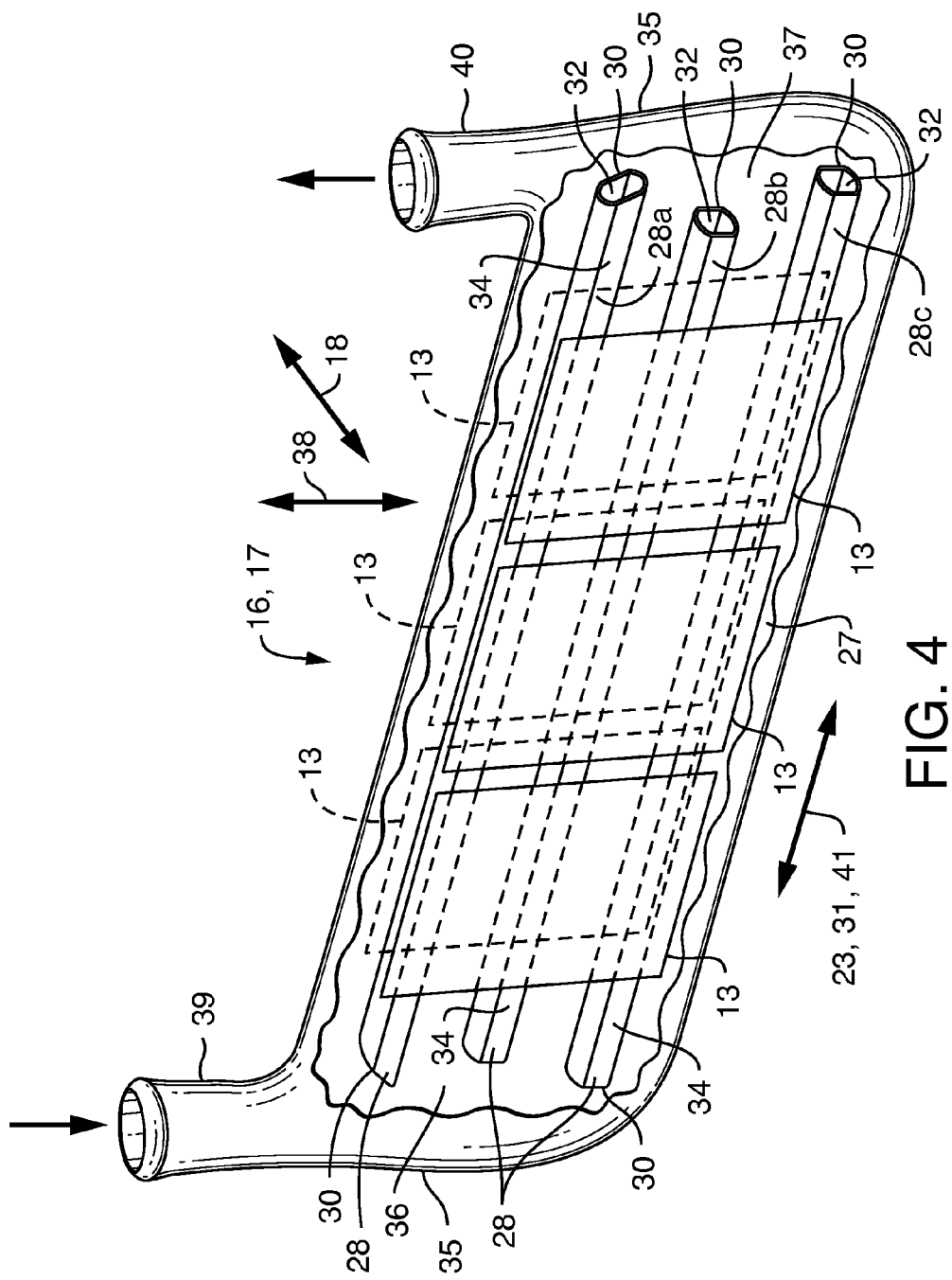
FIG. 4 is an isometric view of the heating or cooling tube with thermoelectric generators shown in the transparent form and with wall shown in the transparent form.
Figure 5:
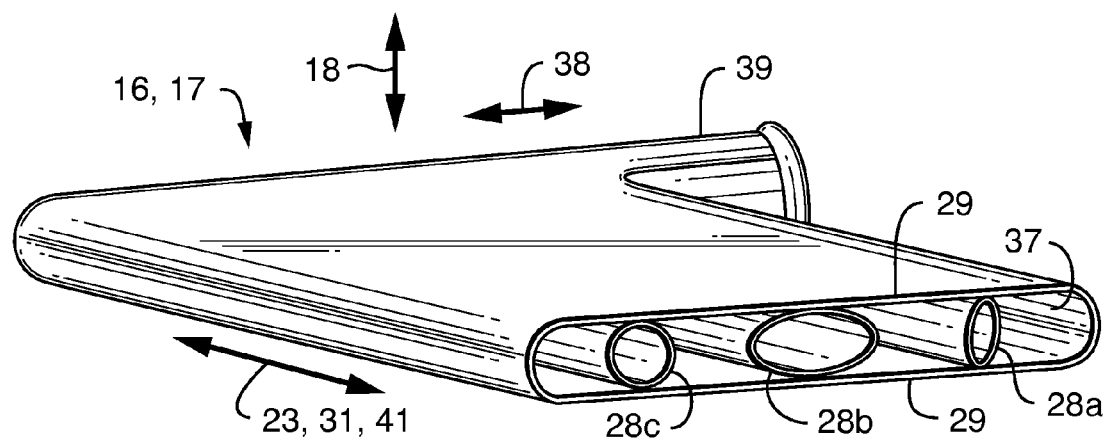
FIG. 5 is a cross section of the tube in an isometric view.
Figure 6:
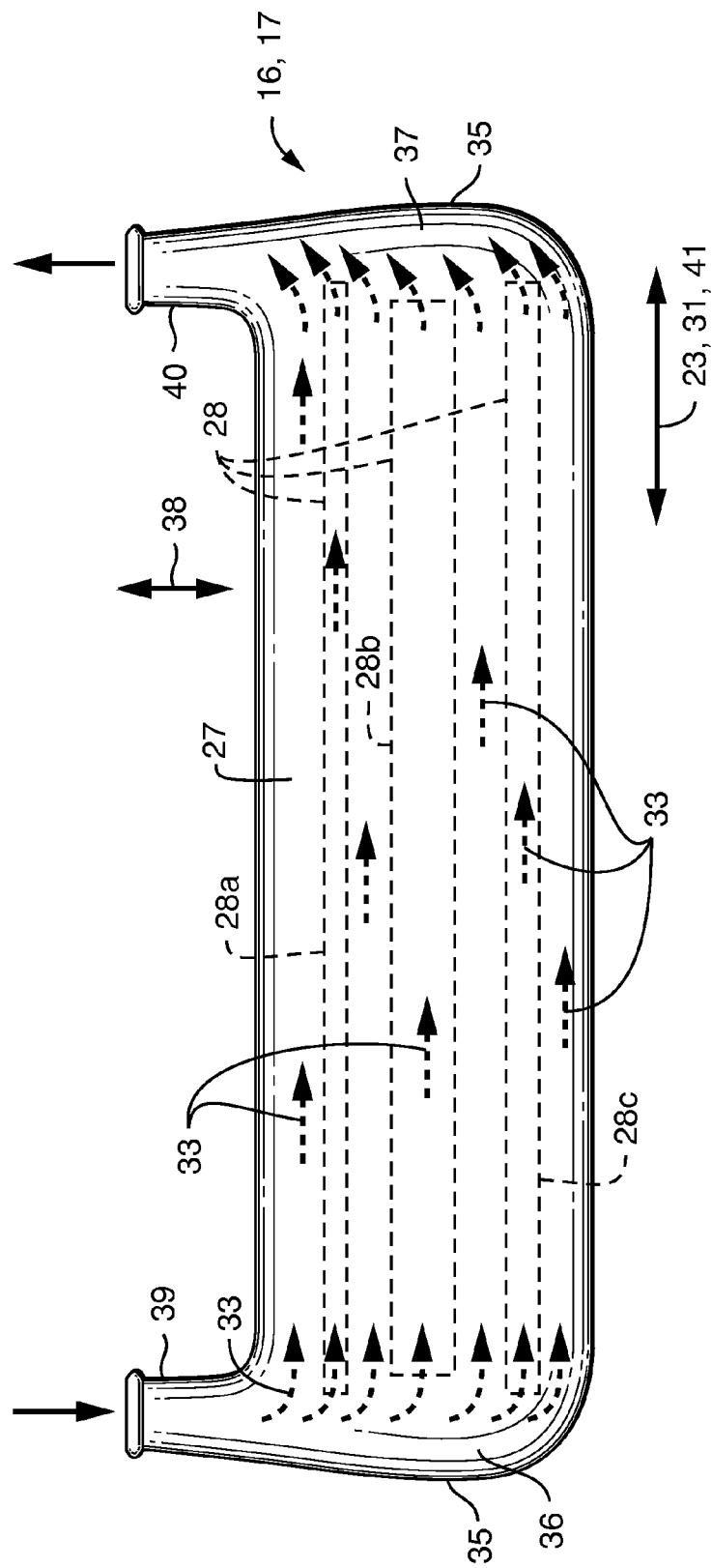
FIG. 6 is a longitudinal section of the tube in a top view.
Figure 7:
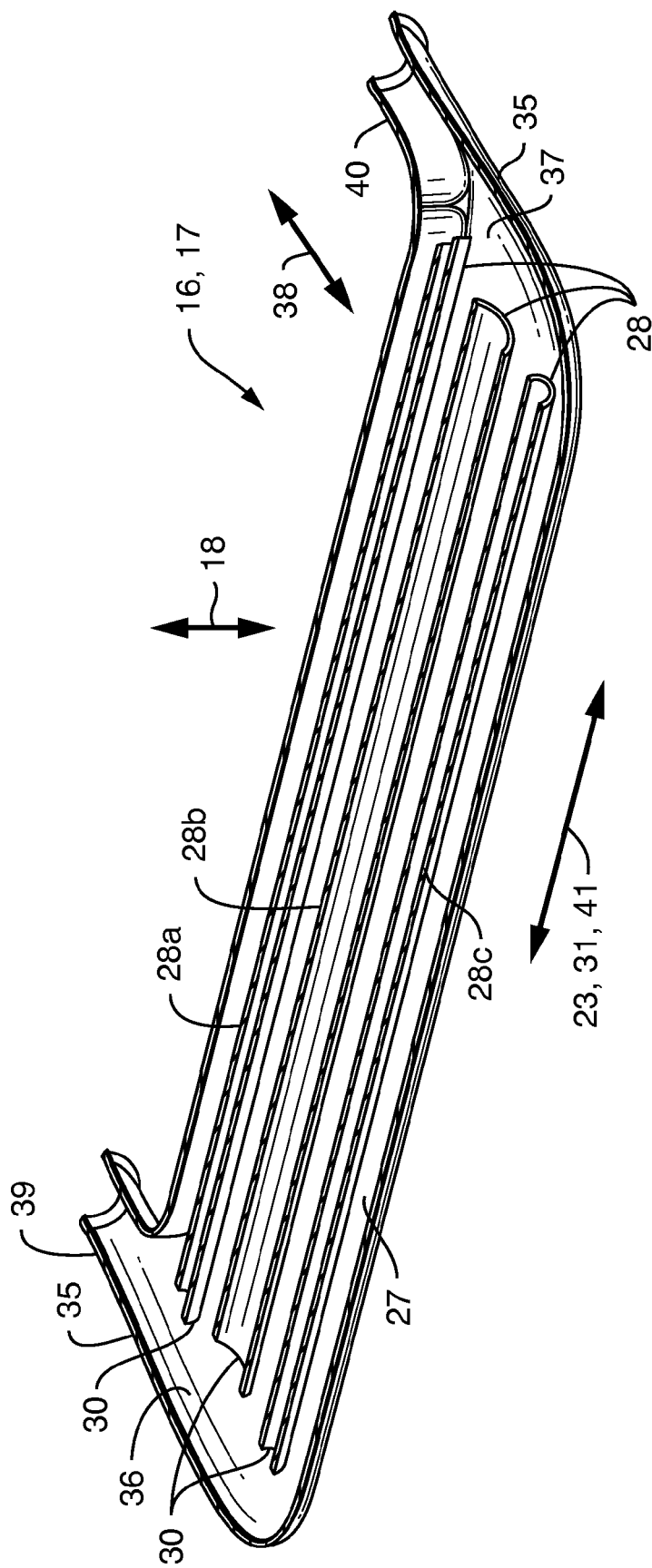
FIG. 7 is a longitudinal section of the tube in an isometric view.

Only a single thermoelectric generator 13 each can be recognized in an intermediate space not shown in detail in the view in FIG. 2, which is located between two adjacent tubes 16, 17 in the stacking direction 18. It is clear that a plurality of such thermoelectric generators 13 may also be arranged one after another in the respective intermediate space in a longitudinal direction 23 of the stack 21, indicated, e.g., by a double arrow in FIG. 3, which direction is at right angles to the drawing plane in FIG. 2. FIGS. 3 and 4 correspondingly show embodiments in which, purely as an example and without limitation of the general nature, only three such thermoelectric generators 13 each are arranged one after another in the longitudinal direction 23 of the stack.

Corresponding to FIG. 2, stack 21 is braced in the stacking direction 18 corresponding to arrows 24, as a result of which the tubes 16, 17 are supported on the respective thermoelectric generator 13 in a prestressed manner via the graphite film 22 in the stacking direction 18. The prestressing force (compressive force) 24 is generated in the example shown in FIG. 2 by means of a prestressing means 25, which may be arranged in the housing 8 of the heat exchanger 7 or may be formed, as in the example being shown, by the housing 8 of the heat exchanger 7 itself. The prestressing means 25 comprises especially two end plates or end panels 26, which are arranged on both sides of the stack 21 in the stacking direction 18 and receive the stack 21 between them in the stacking direction 18. The end plates 26 may be contact each with the outermost tube 16 or 17 of the stack 21. Furthermore, the end plates 26 may be braced with one another by means of tension rods, not shown here, as a result of which the prestressing force 24 oriented in the stacking direction 18 is generated and transmitted to the stack 21. The prestressing force 24 is oriented to generate a force of pressure, which may likewise be designated hereinafter by 24.

To prevent the bracing of the stack 21 from leading to an indentation of the heating tubes 16 and of the cooling tubes 17, a support structure, which is not, however, shown in FIGS. 2 and 3, may be arranged in an interior space 27 of the respective tube 16, 17. This support structure is formed according to FIGS. 4 through 11 by a plurality of support tubes 28 and 28a, 28b and 28c. The respective tube 16, 17, which is consequently such a heating tube 16 or such a cooling tube 17, contains, purely as an example and without limitation of the general nature, exactly three such support tubes 28. Each support tube 28 is supported in the stacking direction 18 on wall sections 29 of the respective tube 16, 17, which said wall sections face each other. As can be recognized, the three support tubes 28 have different geometries.

The three support tubes 28 have different tube lengths in FIG. 4. Furthermore, one support tube 28a differs from the other support tubes 28b and 28b by beveled tube ends 30. The support tubes 28 differ, besides, due to different tube cross sections in the embodiments shown in FIGS. 5 through 7, 10 and 11. For example, one support tube 28c has a round tube cross section, while the other two support tubes 28a and 28b have each an elliptical tube cross section. Support tube 28a is supported in its elliptical cross section on the wall sections 29 over its long axis, whereas support tube 28b is supported in its elliptical cross section on the wall sections 29 over the short axis.

The support tubes 28 are located at spaced locations from each other within the respective tube 16, 17 at right angles to their longitudinal direction 31 indicated by a double arrow, which extends in parallel to the longitudinal direction 23 of the stack, so that they mutually do not touch each other. Furthermore, the support tubes 28 are provided each with a cross section closed in the circumferential direction. In addition, the support tubes 28 are open at their ends. Each support tube 28 correspondingly has at its tube end 30 a tube opening 32. The support tubes 28 are arranged especially advantageously within the respective tube 16, 17 such that the exhaust gas and the cooling agent can flow past and through them. Possible flow paths are indicated, purely as examples, by arrows in FIG. 6 and are designated by 33.

The support tubes 28 have each two diametrically opposite, flattened circumferential areas 34 in the embodiment being shown in FIG. 4. The support tubes 28 can be supported in the braced state of the stack 21 and of the respective tube 16, 17 flatly on the wall sections 29 of the respective tube 16, 17 with these flattened circumferential areas 34.

In the embodiments shown in FIGS. 3 through 7 and 11, the respective tube 16, 17 has an inlet area 36 and an outlet area 37 at its longitudinal ends 35. The inlet area 36 and the outlet area 37 are located opposite each other in relation to the longitudinal direction 31 of the tube and extend each in a transverse direction 38 of the tube, which extends at right angles to the longitudinal direction 31 and at right angles to the stacking direction 18. An inlet pipe connection 39 is connected to the inlet area 36 in the transverse direction 38 of the tube. An outlet pipe connection 40 is likewise connected to the outlet area 37 in the transverse direction 38 of the tube. The inlet pipe connection 39 and the outlet pipe connection 40 are oriented in the same direction in the example, so that they are located on the same side of the respective tube 16, 17. As can be determined, especially from FIGS. 4, 6, 7 and 11, the support tubes 28 dip to different depths into the inlet area 36 and into the outlet area 37 in their longitudinal direction. One support tube 28a has beveled tube ends 30, such that one tube opening 32 faces the inlet pipe connection 39 and the other tube opening 32 faces the outlet pipe connection 40. Contrary to this, the pipe openings 32 of the other support tubes 28b and 28c are oriented in the longitudinal direction of the tube 31, i.e., axially.

In the embodiments shown in FIGS. 4 through 7, the support tubes 28 extend within the respective tube 16, 17 in a straight line and, besides, in parallel to the longitudinal direction 23 of the stack, which coincides with a longitudinal direction 41 of the respective tube 16, 17.

Figure 8:
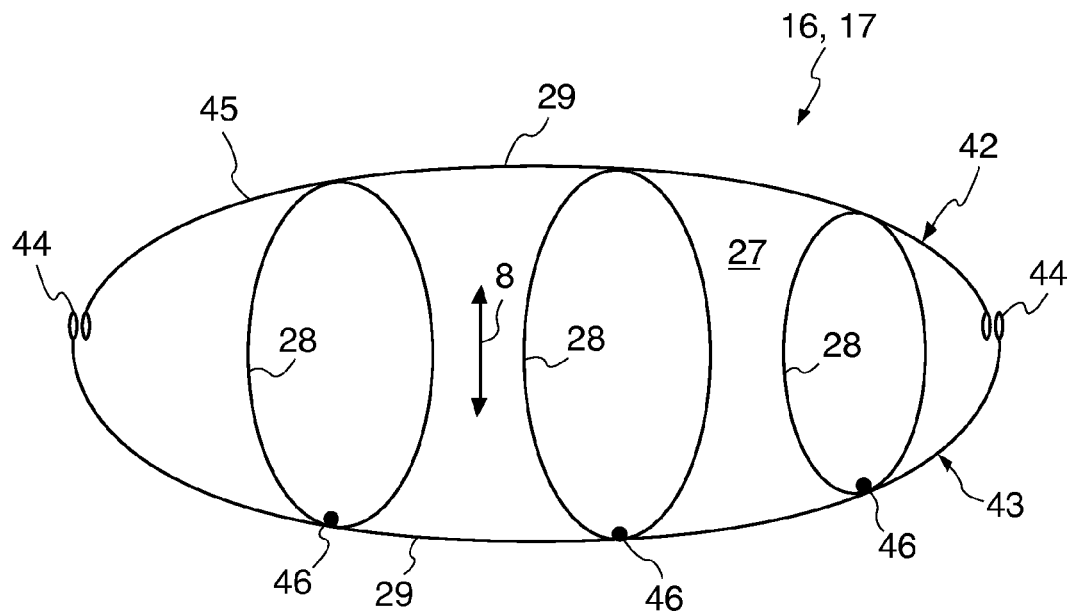
FIG. 8 is a simplified cross section of the tube an unbraced state.
Figure 9:
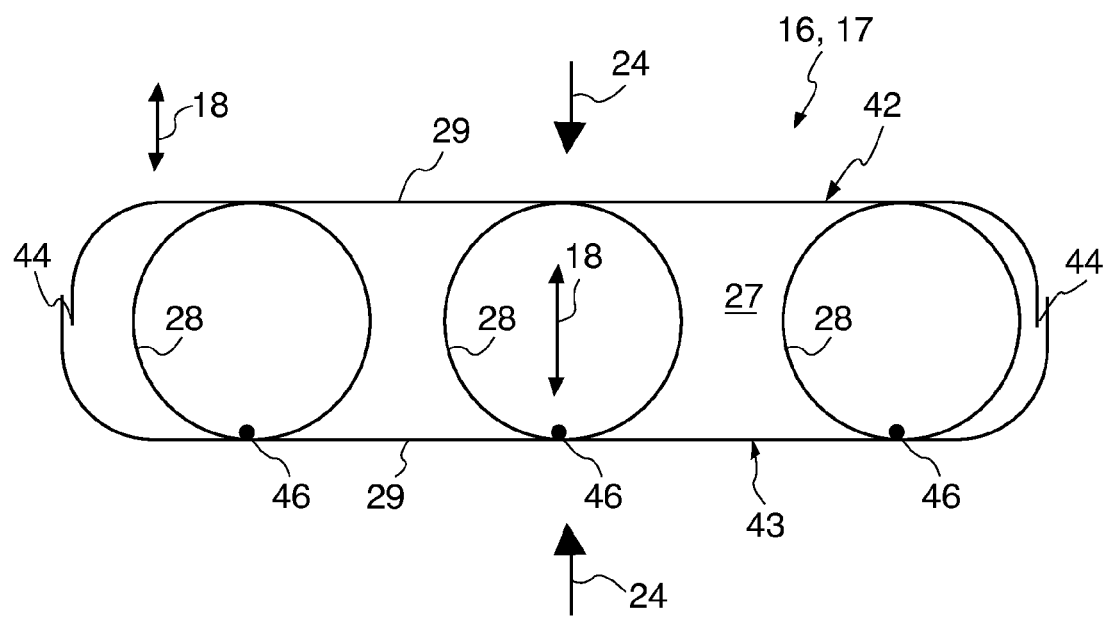
FIG. 9 is the cross section of the tube from FIG. 8 in a braced state.

As can be determined especially from FIGS. 8 and 9, the respective tube 16, 17 may be manufactured, for example, in the semimonocoque construction, so that the respective tube 16, 17 has two half shells 42, 43. According to the view selected in FIGS. 8 and 9, the two half shells 42, 43 may also be called upper shell 42 and lower shell 43. The two half shells 42, 43 are permanently connected to one another at the edge. A corresponding connection area is designated by 44 in FIGS. 8 and 9. The connection area 44 may be manufactured, for example, by means of a welded connection or by means of a beaded connection. The half shells 42, 43 may be advantageously manufactured according to FIGS. 6 and 7 such that they have half of an inlet pipe connection 39 and half of an outlet pipe connection 40 each, so that the respective pipe connection 39, 40 is completed during the assembly of the two half shells 42, 43 to form the respective tube 16, 17.

A segmented mode of construction, which comprises, for example, two end pieces and a middle piece, is also conceivable as an alternative. One end piece each may be formed, on the one hand, by the outlet area 37 and the inlet pipe connection 39, and, on the other hand, by the outlet area 37 and the outlet pipe connection 40. The middle piece, to which the two end pieces are attached axially on the front side, defines a tubular body or jacket body, in which the support tubes 28 are arranged.

The tubes 16, 17 are designed, on the whole, as flat tubes, so that they have a flat cross section through which flow is possible. The respective cross section of the respective tube 16, 17, through which flow is possible, is consequently larger in the transverse direction of the tube than in the stacking direction 18.

FIG. 8 shows a relaxed state, which is present in the absence of force of pressure 24. As can be recognized, a wall 45 of the respective tube 16, 17 is arched outwardly. The support tubes 28 have an elliptical cross section each in the example shown in FIG. 8, and the longer axis of this cross section is oriented in the stacking direction 18. The support tubes 28 are fastened in the example according to FIGS. 8 and 9 at one of the two half shells 42, 43 only, here to the lower shell 43, for example, by means of a welded connection 46. The three support tubes 28 shown are fastened each to the same half shell 42, 43, namely, to the lower shell 43, in the example according to FIGS. 8 and 9. An embodiment in which different support tubes 28 are fastened to different half shells 42, 43 is also conceivable.

Furthermore, the support tubes 28 are dimensioned as an example in FIG. 8 such that they are also in contact with the opposite half shell 42 in the relaxed state.

The wall sections 29, which are located mutually opposite each other in the stacking direction 18, are each preferably planar and are located each in a plane extending at right angles to the stacking direction 18 in the braced state according to FIG. 9, which develops due to the force of pressure 24 being applied. The support tubes 28 are elastically deformed by the force of pressure 24 in this state. For example, the long axes of the elliptical cross sections may be shortened, while the short axes of the elliptical cross sections may be made longer at the same time. The cross sections of the support tubes 28 are essentially round in the prestressed state according to FIG. 9. Since the support tubes 28 and also the respective tube 16, 17 are elastically deformed by the force of pressure 24, they can again return into the relaxed state according to FIG. 8 in the absence of the force of pressure 24.

The support tubes 28 are manufactured, for example, from a stainless steel. The respective heating tube 16 is likewise manufactured, for example, from a steel material. The respective cooling tube 17 is manufactured, for example, from a light alloy material.

Figure 10:
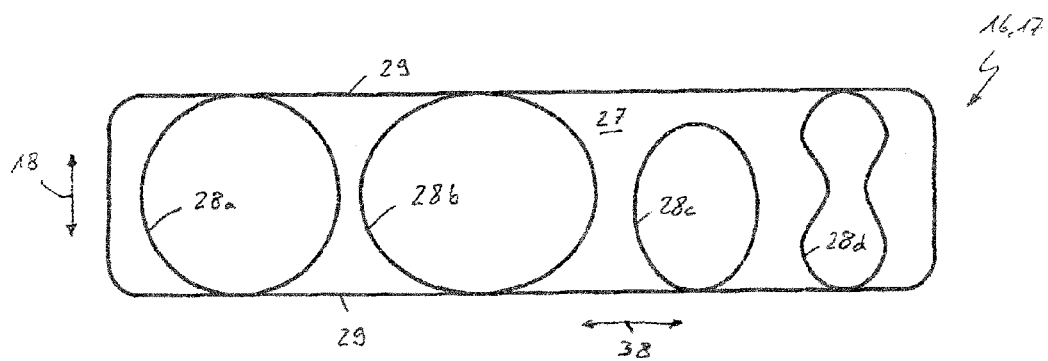
FIG. 10 is a cross section of the tube in another embodiment.

FIG. 10 shows, purely as an example, another embodiment of such a cooling or heating tube 16, 17, which contains four support tubes 28 and 28a, 28b, 28c and 28d. The cooling or heating tube 16, 17 contains four other support tubes 28 or 28e, 28f, 28g and 28h in the embodiment shown in FIG. 11. FIG. 10 shows a variant in which the individual support tubes 28 have different diameters. Support tube 28a has a round cross section; support tube 28b has an elliptical cross section with horizontal long axis. Support tube 28c has, by contrast, an elliptical cross section with vertical long axis, and provisions may additionally also be made here for the support tube 28c to be dimensioned so small in terms of its cross section that it comes into contact with the two opposite wall sections 29 only when the force of pressure 24 is applied, which is not the case in the state shown in FIG. 10. If at least one support tube 28, which touches both wall sections 29 prior to the application of the force of pressure 24, is present in the respective cooling or heating tube 16, 17, and at least one support tube 28 is present at the same time, which touches the two wall sections 28 only when the force of pressure 24 is applied, a special distribution of the force of pressure can be brought about in a specific manner. The distribution of the force of pressure within the cooling or heating tube 16, 17 can also be influenced in a specific manner by the simultaneous use of a support tube 28 with round cross section and of a support tube 28 with elliptical cross section.

Figure 11:
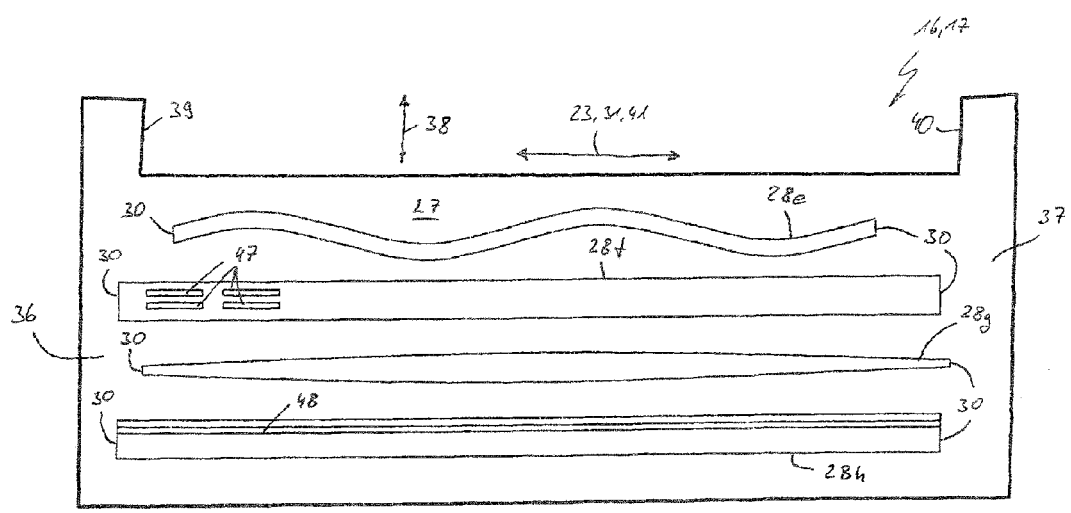
FIG. 11 is a longitudinal section of the tube in a top view in another embodiment.

In addition, FIG. 11 shows a support tube 28 in the form of the support tube 28d that has a comparatively complex cross section, which is embodied here in the example in a figure-eight pattern. The spring action of the respective support tube 28 can be set in a specific manner by selecting the geometry of the cross section, especially by selecting the radii used.

According to FIG. 11, support tubes 28 that do not extend in parallel and in a straight line may also be arranged in the cooling or heating tube 16, 17. For example, support tube 28e may extend in a serpentine pattern in the longitudinal direction 31 and 41 of the respective tube. Both the supporting action and the flow routing effect can be influenced hereby in a specific manner.

According to FIG. 11, at least one support tube 28f may also have a lateral or radial opening 47 between its tube ends 30. Four slot-like openings 47 are indicated in the example. Such openings 47 may also be embodied with different opening cross sections or in the form of a perforation. The spring property of the respective support tube 28 and the flow routing effect of the respective support tube can be varied in a specific manner by means of such openings 47.

According to FIG. 11, at least one of the support tubes 28 may also have a cross section varying over its longitudinal direction 31. For example, the cross section increases with increasing distance from one tube end 30 approximately up to the middle and then decreases again up to the other tube end 30 in the support tube 28g. At the same time, the shape may change as well, for example, from a round shape at one tube end 30 over an elliptical shape in the middle of the tube and again to a round shape at the other tube end 30. This measure can also be used to influence the supporting function and the flow routing function in a specific manner.

Finally, FIG. 11 shows in a variant in the form of the support tube 28h in which at least one tube end 28 has a slot 48 over its entire length, i.e., it has an interruption in the cross-sectional profile. As a result, the support tube 28 has an open, essentially C-shaped cross section. This measure can also be used to influence the supporting function and the flow routing function in a specific manner.

Flow guiding and flow routing can be brought about for the exhaust gas and for the cooling agent within the respective flat heating tube 16 and cooling tube 17, which leads to a homogenization of the temperature distribution in the transverse direction 38 of the tube, thanks to the use of a plurality of support tubes 28 as proposed according to the present invention, which differ from each other by different geometries.

While specific embodiments of the invention have been shown and described in detail to illustrate the application of the principles of the invention, it will be understood that the invention may be embodied otherwise without departing from such principles.

What is claimed is:

1. A heat exchanger for an exhaust system of an internal combustion engine, the heat exchanger comprising:
   a heating tube for carrying hot exhaust gas of the internal combustion engine;
   a cooling tube for carrying a liquid cooling agent;
   a thermoelectric generator for generating an electrical voltage from a temperature difference, the thermoelectric generator being arranged between the heating tube and the cooling tube, the heating tube, the thermoelectric generator and the cooling tube being adjacent to one another and forming a stack in a stacking direction; and
   support tubes supported in the stacking direction on wall sections of at least one of the heating tube and the cooling tube, the wall sections mutually facing each other, each support tube being arranged in the at least one of the heating tube and the cooling tube wherein the support tubes differ from each other by at least one of a tube length, a tube end and a tube cross section and are arranged next to each other in the at least one of the heating tube and the cooling tube, at a right angle to a longitudinal direction of the at least one of the heating tube and the cooling tube.

2. A heat exchanger in accordance with claim 1, wherein:
   the stack is force loaded in the stacking direction to brace the heating tube, the thermoelectric generator and the cooling tube with one another; and
   each support tube has a round tubular cross section and is elastically deformed by the pressure of the loading force.

3. A heat exchanger in accordance with claim 1, wherein the support tubes are located at spaced locations from one another within the at least one of the heating tube and the cooling tube.

4. A heat exchanger in accordance with claim 1, wherein the support tubes are open on an end side and are arranged in the at least one of the heating tube and the cooling tube such that the exhaust gas or the cooling agent can flow past and through the support tubes.

5. A heat exchanger in accordance with claim 1, wherein at least one of the support tubes has an outer side with a flattened circumferential area that is flatly supported on a wall section of the at least one of the heating tube and the cooling tube.

6. A heat exchanger in accordance with claim 1, further comprising: an inlet pipe connection; and an outlet pipe connection, wherein:
   the at least one of the heating tube and the cooling tube has an inlet area and an outlet area at longitudinal ends thereof;
   the inlet area and the outlet area extend in a transverse direction of the at least one of the heating tube and the cooling tube, which extends at a right angle to the longitudinal direction of the at least one of the heating tube and the cooling tube and at a right angle to the stacking direction;

the inlet pipe connection is connected to the inlet area in the transverse direction of the at least one of the heating tube and the cooling tube; and the outlet pipe connection is connected to the outlet area in the transverse direction of the at least one of the heating tube and the cooling tube.

7. A heat exchanger in accordance with claim 6, wherein the support tubes dip to different depths into the inlet area and/or into the outlet area in a longitudinal direction of the support tubes.

8. A heat exchanger in accordance with claim 6, wherein at least one of the support tubes has at least one beveled tube end, whereby a tube opening at the at least one beveled tube end faces the inlet pipe connection or the outlet pipe connection.

9. A heat exchanger in accordance with claim 1, wherein the at least one of the heating tube and the cooling tube is manufactured with two half shells according to a semimonocoque construction, wherein the support tubes are fastened only to one of the two half shells.

10. A heat exchanger in accordance with claim 1, wherein the support tubes extend within the at least one of the heating tube and the cooling tube in a straight line and in parallel to a longitudinal direction of the at least one of the heating tube and the cooling tube.

11. A motor vehicle internal combustion engine heat exchanger comprising:

a heating tube with wall sections mutually facing each other, the heating tube construction carrying hot fluid heated by the internal combustion engine;

a cooling tube with wall sections mutually facing each other, cooling tube construction carrying a fluid cooling agent;

a thermoelectric generator generating an electrical voltage from a temperature difference between the heating tube and the cooling tube, the thermoelectric generator being arranged between the heating tube and the cooling tube, the heating tube, the thermoelectric generator and the cooling tube being adjacent to one another and forming a stack in a stacking direction; and support tubes arranged adjacent to each other and extending at a right angle to a longitudinal direction within one of the heating tube and the cooling tube, each support tube being supported in the stacking direction on one of the wall sections of the one of the heating tube and the cooling tube, wherein the support tubes differ from each other by at least one of a tube length, a tube end configuration and a tube cross sectional shape.

12. A heat exchanger in accordance with claim 11, wherein:

the stack has a compression force applied in the stacking direction to force contact of the heating tube, the thermoelectric generator and the cooling tube with one another; and each support tube has a round tubular cross section and is elastically deformed by the pressure of the loading force.

13. A heat exchanger in accordance with claim 11, wherein the support tubes are located at spaced locations from one another.

14. A heat exchanger in accordance with claim 11, wherein the support tubes are open on an end side and are arranged such that the hot fluid or the cooling agent can flow past and through the support tubes.

15. A heat exchanger in accordance with claim 11, wherein at least one of the support tubes has an outer side with a flattened circumferential area that is flatly supported on a wall section of at least one of the heating tube and the cooling tube.

16. A heat exchanger in accordance with claim 11, wherein at least one of the heating tube and the cooling tube further comprises:

an inlet pipe connection; and an outlet pipe connection, wherein:

the at least one of the heating tube and the cooling tube has an inlet area and an outlet area at longitudinal ends thereof;

the inlet area and the outlet area extend in a transverse direction of the at least one of the heating tube and the cooling tube, which extends at a right angle to the longitudinal direction of the at least one of the heating tube and the cooling tube and at a right angle to the stacking direction;

the inlet pipe connection is connected to the inlet area in the transverse direction of the at least one of the heating tube and the cooling tube; and the outlet pipe connection is connected to the outlet area in the transverse direction of the at least one of the heating tube and the cooling tube.

17. A heat exchanger in accordance with claim 16, wherein the support tubes extend to different depths into the inlet area and/or into the outlet area in a longitudinal direction of the support tubes.

18. A heat exchanger in accordance with claim 16, wherein at least one of the support tubes has at least one beveled tube end, whereby a tube opening at the at least one beveled tube end faces the inlet pipe connection or the outlet pipe connection.

19. A heat exchanger in accordance with claim 11, wherein the at least one of the heating tube and the cooling tube is manufactured with two half shells according to a semimonocoque construction, wherein the support tubes are fastened only to one of the two half shells.

20. A heat exchanger in accordance with claim 11, wherein the support tubes extend within the at least one of the heating tube and the cooling tube in a straight line and in parallel to a longitudinal direction of the at least one of the heating tube and the cooling tube.

* * * * *